(12) United States Patent
Teetzel et al.

(10) Patent No.: US 8,908,389 B2
(45) Date of Patent: Dec. 9, 2014

(54) POWER DISTRIBUTION SYSTEM AND HELMET AND METHOD EMPLOYING THE SAME

(71) Applicant: Wilcox Industries Corp., Newington, NH (US)

(72) Inventors: James W. Teetzel, York, ME (US); Justin D. Harris, Haverhill, MA (US)

(73) Assignee: Wilcox Industries Corp., Newington, NH (US)

( * ) Notice: Subject to any disclaimer, the term of this patent is extended or adjusted under 35 U.S.C. 154(b) by 164 days.

(21) Appl. No.: 13/647,515

(22) Filed: Oct. 9, 2012

(65) Prior Publication Data
US 2013/0086722 A1   Apr. 11, 2013

Related U.S. Application Data

(60) Provisional application No. 61/545,076, filed on Oct. 7, 2011.

(51) Int. Cl.
| | |
|---|---|
| A42B 3/30 | (2006.01) |
| F41H 1/04 | (2006.01) |
| H02J 4/00 | (2006.01) |
| A42B 3/04 | (2006.01) |
| H02J 1/00 | (2006.01) |

(52) U.S. Cl.
CPC .. *A42B 3/04* (2013.01); *F41H 1/04* (2013.01); *H02J 1/00* (2013.01)
USPC .......... 361/807; 2/410; 2/205; 2/6.1; 362/106

(58) Field of Classification Search
USPC .......... 361/807–812; 345/8; 2/410; 362/106; 224/181
See application file for complete search history.

(56) References Cited

U.S. PATENT DOCUMENTS

| | | | | |
|---|---|---|---|---|
| 5,357,409 A | * | 10/1994 | Glatt | 362/105 |
| 5,758,947 A | * | 6/1998 | Glatt | 362/105 |
| 7,963,426 B2 | * | 6/2011 | Grubel et al. | 224/181 |
| 8,531,592 B2 | * | 9/2013 | Teetzel et al. | 348/373 |
| 2006/0202629 A1 | * | 9/2006 | Colwell | 315/119 |
| 2011/0145981 A1 | * | 6/2011 | Teetzel et al. | 2/422 |
| 2011/0170280 A1 | * | 7/2011 | Soto et al. | 362/105 |
| 2011/0239354 A1 | * | 10/2011 | Celona et al. | 2/422 |
| 2012/0224356 A1 | * | 9/2012 | Fischer et al. | 362/106 |
| 2012/0291184 A1 | * | 11/2012 | Basson | 2/414 |
| 2012/0317706 A1 | * | 12/2012 | Lebel et al. | 2/422 |
| 2014/0000013 A1 | * | 1/2014 | Redpath et al. | 2/422 |

* cited by examiner

*Primary Examiner* — Robert J Hoffberg
*Assistant Examiner* — Michael Matey
(74) *Attorney, Agent, or Firm* — McLane, Graf, Raulerson & Middleton, Professional Association

(57) ABSTRACT

An integrated accessory mounting and electrical interconnection device are provided which can be embedded or attached to the surface of a ballistic or non-ballistic helmet. The helmet system herein includes a flexible circuit substrate that may be embedded between a ballistic shell and an outer skin or shell. The helmet system and method allow a secure connection of helmet mounted accessories to the helmet without the need to penetrate any one or more layers of the ballistic shell with mounting hardware, fasteners, wiring vias, and so forth.

20 Claims, 17 Drawing Sheets

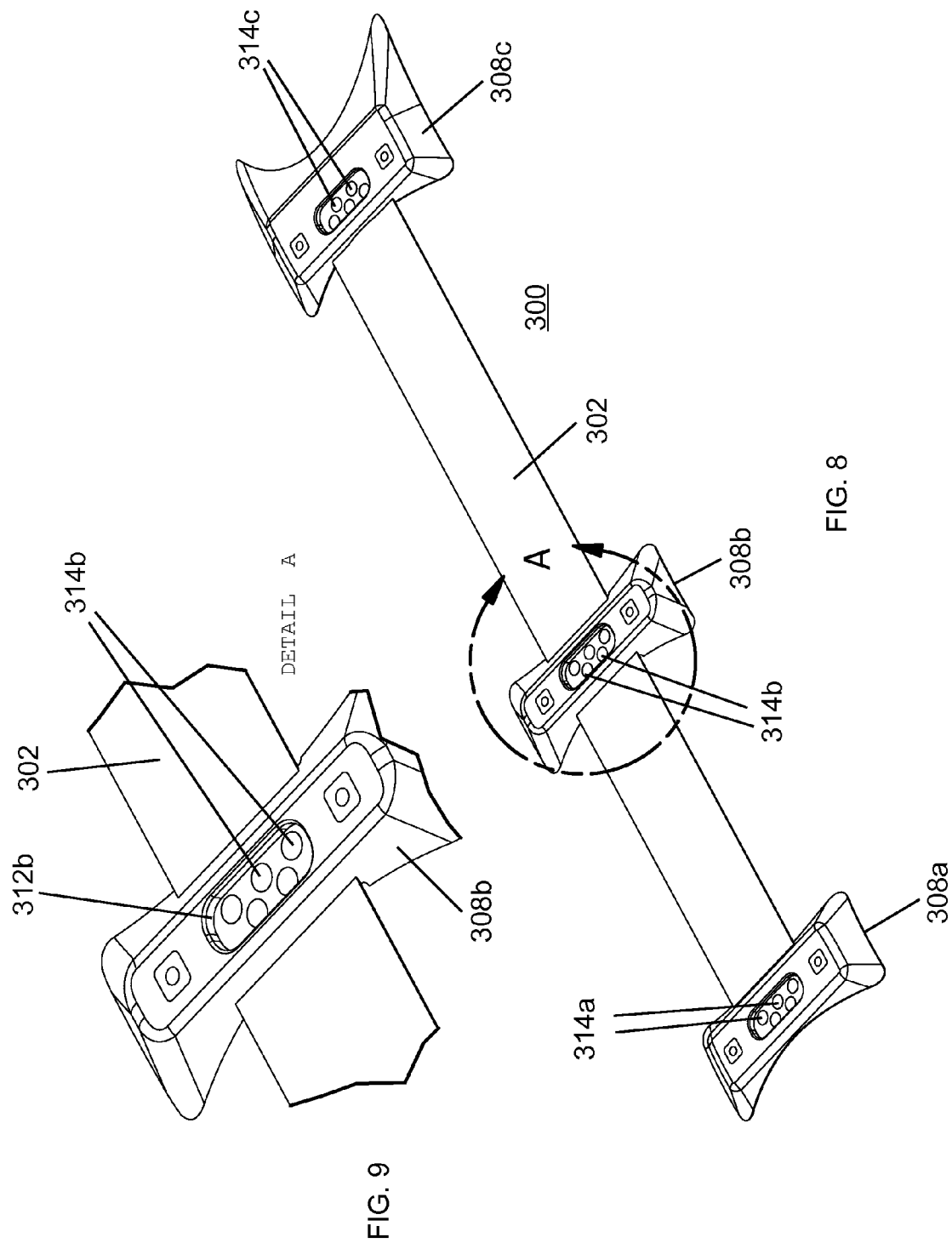

POWER DISTRIBUTION SYSTEM AND HELMET AND METHOD EMPLOYING THE SAME

BACKGROUND

The present disclosure relates generally to protective helmets such as a ballistic helmet or other helmets having a similar construction, such as a ballistic tactical helmet for use by law enforcement personnel, military field or combat helmets, or the like. More particularly, the present disclosure relates to an electrical power distribution system for a helmet, and a method and helmet employing the same, the power distribution system employing a circuit carried on a flexible circuit substrate to generally conform to the shape of the helmet, the flexible circuit substrate carrying thereon a conductive layer comprising conductive tracings, etchings, depositions, or the like, applied in a preselected pattern configured to provide the desired electrical connections between one or more electronic accessory devices or components attached or mounted to the helmet.

Commonly, a military ballistic helmet or the like is configured to carry one or more accessories or attachments, such as a flashlight, viewing optics and devices, such as a monocular, binoculars, monocular or binocular night vision goggle (NVG) devices (NVG, including enhanced night vision goggle devices (ENVG)), thermal imaging devices, cameras, friend or foe identification (IFF) systems, and so forth.

The helmet may be provided with a plurality of openings or holes therein for mounting such accessories to the helmet or for receiving fasteners or other mounting mechanisms or hardware such as threaded fasteners, brackets, grommets, etc. By way of example, the front of a helmet may have openings and holes for mounting an accessory such as a flashlight or a bracket or shroud which can accept a helmet mount for a viewing device as described above. Similarly, holes or vias through the ballistic material may be provided in order to provide an electrical connection between a power supply mounted at one location on the helmet, e.g., at the rear of the helmet, and an accessory or device located at another position on the helmet, e.g., by running an electrical cable along the interior of the helmet. Such hardware or openings which penetrate the ballistic shell, either partially or completely, compromise the anti-ballistic properties of the helmet in these regions. The number and complexity of helmet mounted components are increasing, and such components may be computer or microcontroller-based and controlled through the use of electronic signals and sensors, thus resulting in larger and more complex wiring assemblies and posing difficulties in installing such devices while maintaining the ballistic integrity of the helmet.

Therefore, there exists a need for an improved method of integrating accessory mounting and electrical interconnection devices to the surface of a ballistic or non-ballistic helmet which could replace the wiring typically used for electrical power, data, and/or signal transmission and which would reduce wiring complexity, simplify helmet assembly and device attachment.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 8 is an enlarged view of the circuit substrate and mounting bezels.

FIG. 9 is an enlarged view of the region "A" appearing in FIG. 8.

SUMMARY

Figure 1:
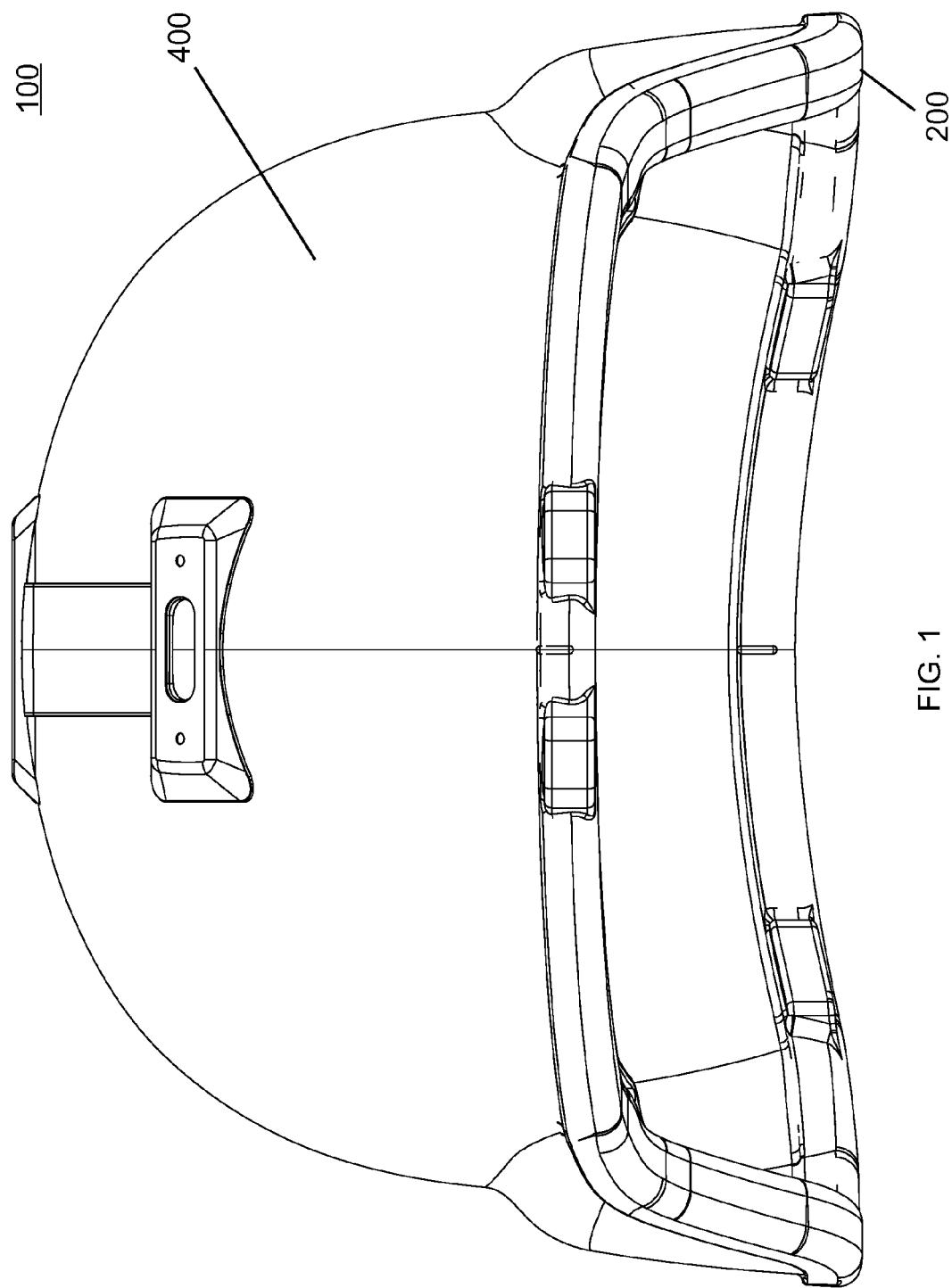
FIG. 1 is a front elevational view of an exemplary helmet in accordance with the present disclosure.
Figure 2:
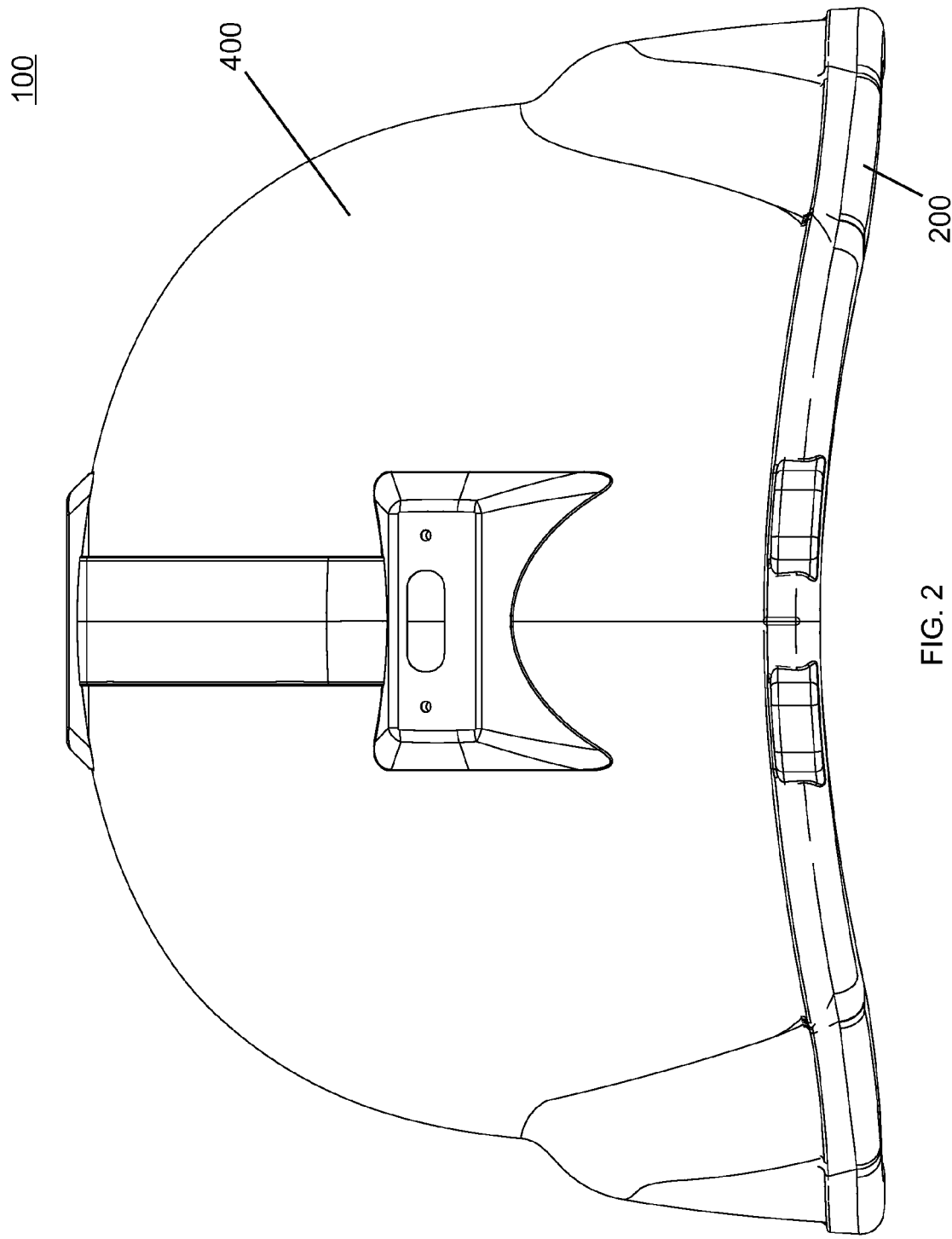
FIG. 2 is a rear elevational view of the embodiment appearing in FIG. 1.
Figure 3:
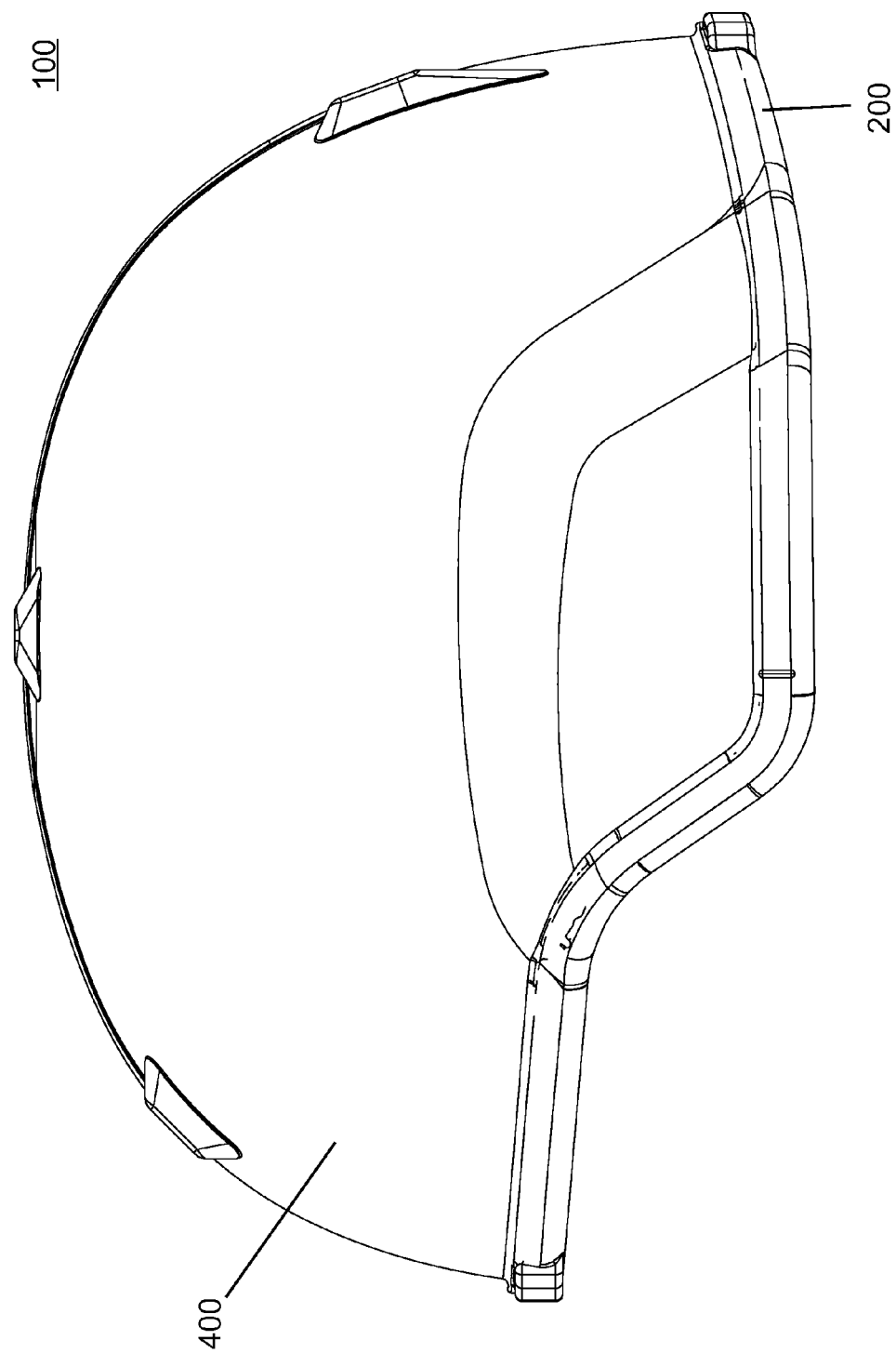
FIG. 3 is a side elevational view of the embodiment appearing in FIG. 1.
Figure 4:
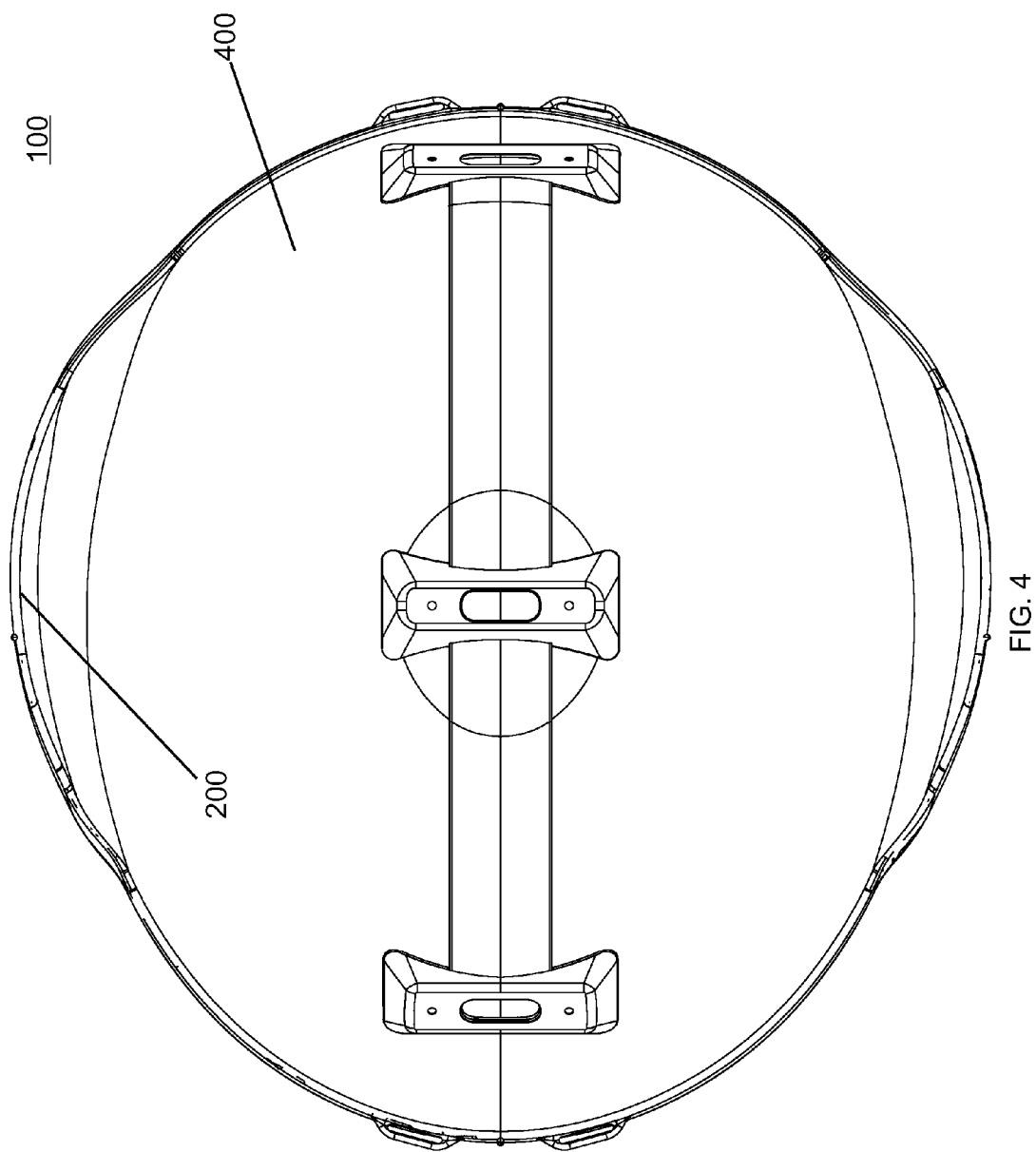
FIG. 4 is a top plan view of the embodiment appearing in FIG. 1.
Figure 5:
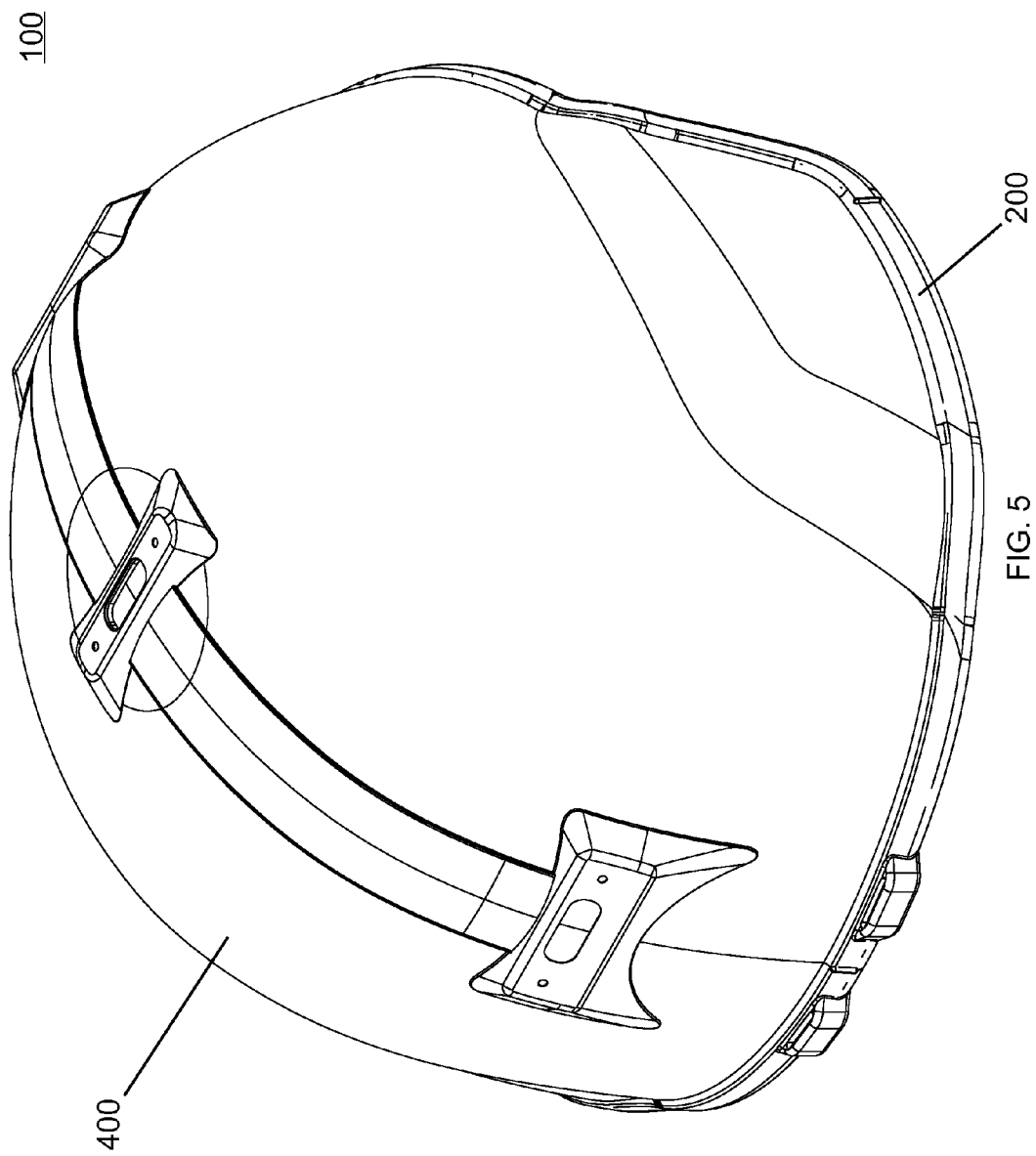
FIG. 5 is an isometric view of the embodiment appearing in FIG. 1, taken generally from the rear and side.
Figure 6:
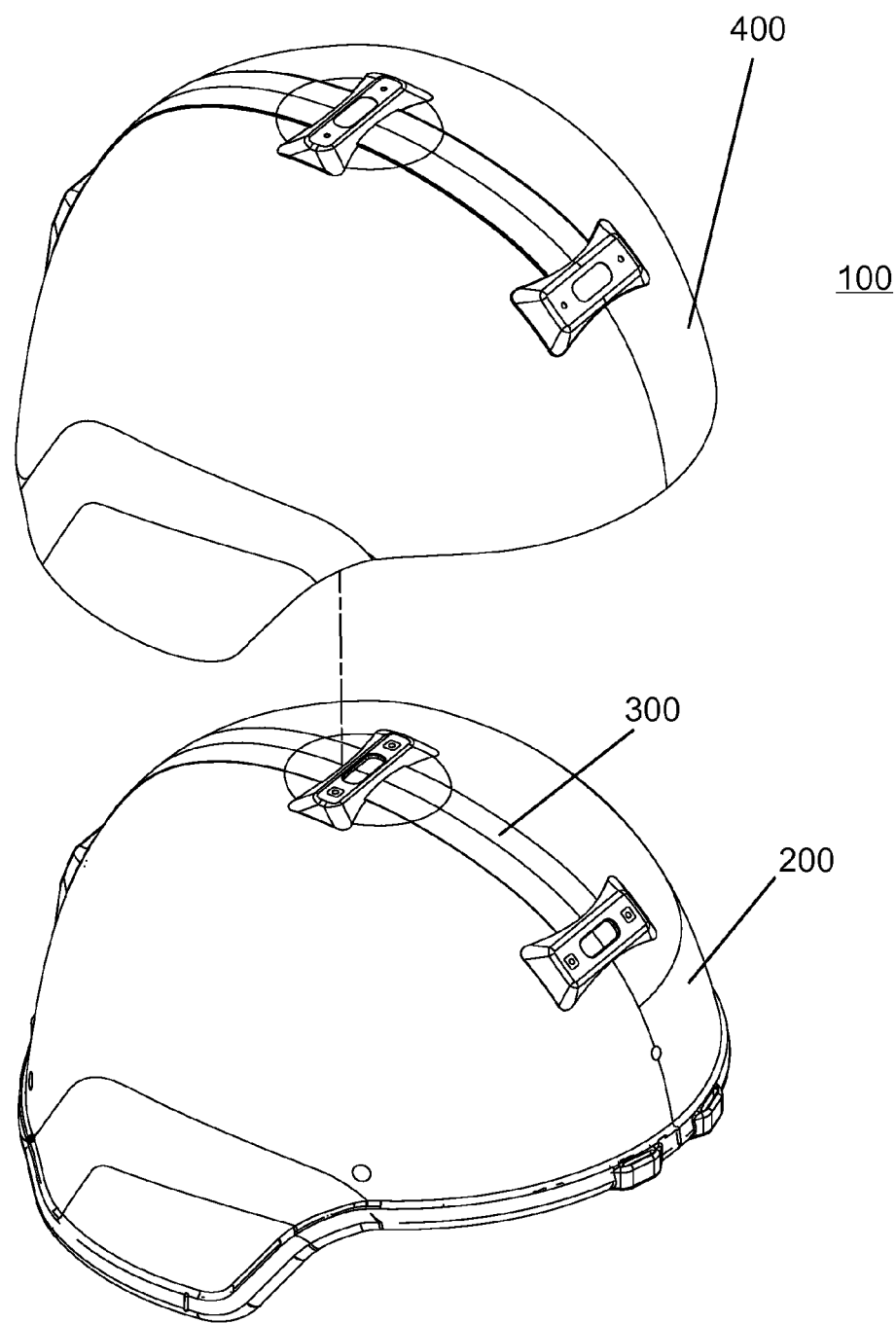
FIG. 6 is a partially exploded isometric view of the embodiment appearing in FIG. 1 illustrating the laminated construction of the ballistic preform or layup, the flexible circuit substrate, and the outer shell or skin.
Figure 7:
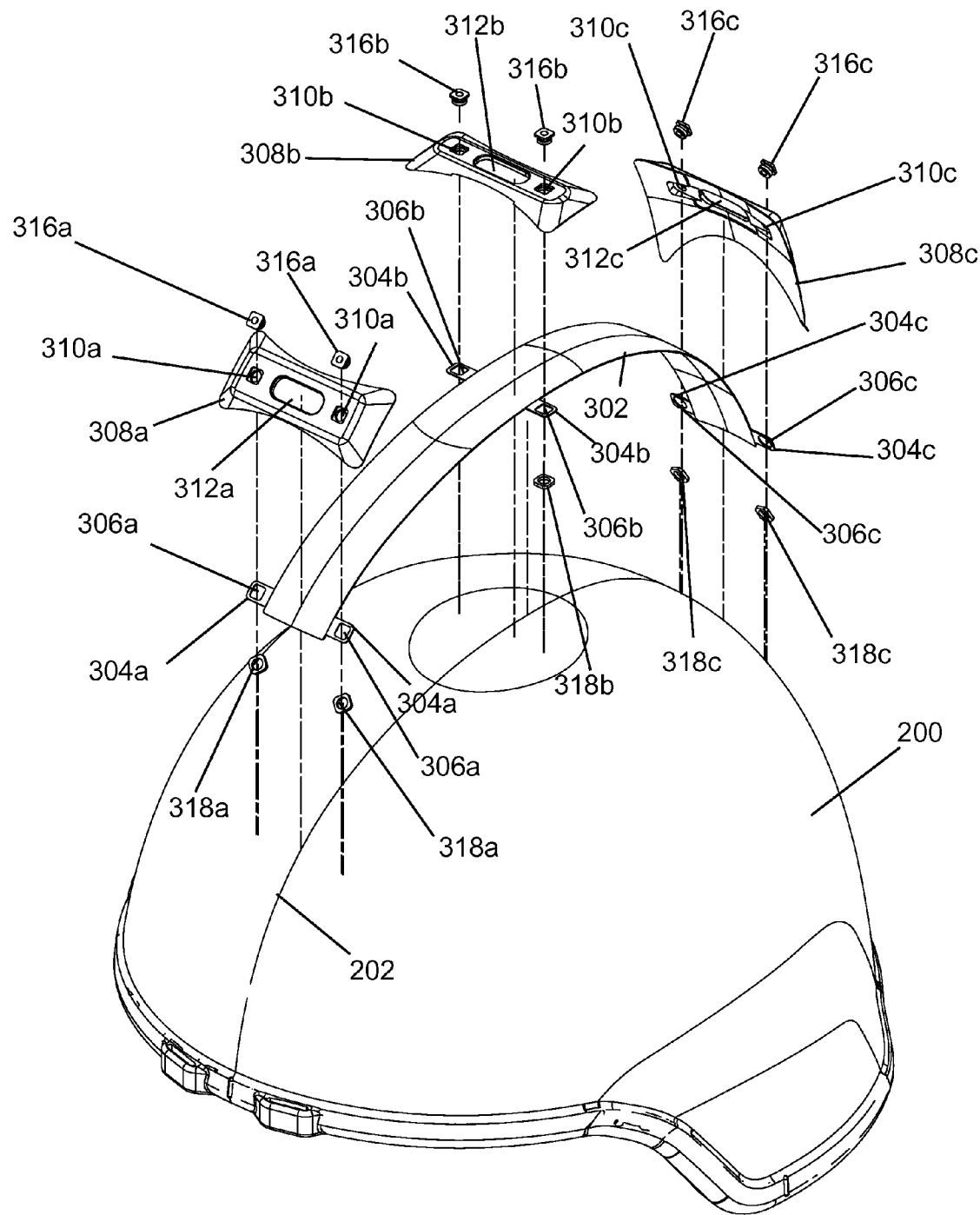
FIG. 7 is an exploded view of the ballistic layup component and the circuit assembly.

A helmet system and method are provided that allow an electrical connection between two or more electrical or electronic components on the helmet by integrating a flexible circuit substrate and mounting plate assembly into or on top of the construction of a helmet shell.

In a first aspect, a helmet accessory power distribution system for providing a supply of electrical power to one or more electrical power-consuming devices attached to a helmet includes a circuit layer extending across a portion of the helmet. The circuit layer defines a circuit and includes a plurality of terminal pads. Each terminal pad includes two or more electrical contacts. The circuit also includes electrical conductors interconnecting the terminal pads. A cover is attached to the circuit layer over each terminal pad, the cover having an aperture aligned with and exposing the electrical contacts. One or more mechanical fasteners are configured to removably and securely hold a helmet accessory in mechanical contact with the cover and in electrical contact with the exposed electrical contacts.

In another aspect, a helmet construction is provided comprising the helmet accessory power distribution system herein and a helmet attached to the circuit layer.

In yet another aspect, a method of providing a supply of electrical power to one or more electrical power-consuming devices attached to a helmet, comprises the step of providing a circuit layer extending across a portion of the helmet, wherein the circuit layer defines a circuit and includes a plurality of terminal pads. Each of the terminal pads includes two or more electrical contacts. The circuit also includes electrical conductors interconnecting the terminal pads. Covers are attached to the circuit layer over each terminal pad, the covers having an aperture aligned with and exposing the electrical contacts. A power supply is secured to one of the covers and an electrical power-consuming device is secured to another one of the covers using one or more mechanical fasteners. The one or more mechanical fasteners are configured to removably and securely hold the power supply and the electrical power-consuming device in mechanical contact with the respective cover and in electrical contact with the exposed electrical contacts. Power is then delivered from the power supply to the electrical power-consuming device through the circuit layer.

In preferred aspects, the helmet system and method allow a secure connection of helmet mounted accessories to the helmet without the need to penetrate any one or more layers of the ballistic shell with mounting hardware, fasteners, wiring vias, and so forth. It is to be understood that both the following detailed description is exemplary and explanatory only and are not restrictive of the invention.

DETAILED DESCRIPTION OF THE PREFERRED EMBODIMENT

Referring now to the drawings wherein like reference numerals designate like parts throughout the several views, FIGS. 1-8 illustrate a ballistic helmet 100 which includes a ballistic shell or base layer 200, an intermediate circuit layer 300, and an outer layer(s) 400, formed in accordance with an embodiment of the present disclosure.

The base layer 200 may comprise a molded helmet base, e.g., formed by laying up and molding on a generally helmet shaped pre-form multiple plies of a fiber reinforced composite material, such as aramid fibers (e.g., KEVLAR®) or other ballistic fiber impregnated with a polymer resin. Other ballistic and non-ballistic helmet types, including metal helmets, are also contemplated. An example of a ballistic helmet into which an integrated accessory mounting and electrical interconnection may be provided includes ballistic helmets available from Ceradyne under the product name SEAMLESS BALLISTIC® Helmet. It will be recognized that the present laminated construction in accordance with this disclosure may be adapted for use with a base component 200 formed of other materials, including other plastic or metal helmet types. The base layer may be a finished helmet or, alternatively, may be an unfinished helmet. When the base layer 200 is a finished helmet, the outer layer 400 serves to retain the circuit layer 300 and allows existing helmets to be retrofit with the powered helmet mounting system in accordance with this disclosure. Alternatively, the outer shell 400 may comprise one or more plies of a ballistic fiber reinforced composite material which contributes to the ballistic integrity of the finished helmet.

The circuit layer 300 includes a circuit substrate 302 formed of a flexible material, such as a flexible film or tape, e.g., polyimide, polyester or other material that is able to withstand the elevated temperatures that may result from the bonding and curing of the helmet 100 components. A conductive, e.g., metalized, pattern is formed on the substrate 302 and is comprised of one or more conductive pathways to provide power, control, and/or data signals between two or more mounting plates. The electrically conductive pattern may be formed via etching, depositing, printing (e.g., using a conductive ink containing carbon or other conductive filler), electro plating, or the like to provide a desired conductive pattern Although the illustrated circuit substrate 302 is shown with 3 mounting plates, any number may be provided. In certain embodiments, the number of mounting plates may range from 2 to 6 or more. Such conductive pathways may be formed in any desired circuit pattern for providing one or more electrical power transmission paths, one or more data transmission paths, one or more control signal transmission paths, or any combinations thereof, as required.

In addition, circuit components such as one or more antennae may be formed as a part of the electrically conductive pattern on the circuit substrate. For example, one or more communications antennae may be formed on the circuit substrate and electrically coupled to a communications device of the type which aids in wireless communications between devices or the wearer and other operators. Such communications device may be mounted on the helmet and electrically coupled to the antennae via the exposed terminals on the circuit 300. Alternatively, an antenna pattern on the circuit substrate 302 may be electrically coupled via an adaptor (as detailed below) to a remote communications device worn or carried by the user and located remotely from the helmet. Other antenna types contemplated are radio frequency identification (RFID) antenna(s) for coupling to an RFID device; or GPS antenna(s) for coupling to a navigation system worn by the user and either mounted to the helmet system 100 herein or worn or carried elsewhere on the user and eclectically coupled via an adapter such as that described below.

Optionally, the conductive pattern may be coated with an encapsulant and/or laminated to protect the circuit pattern from damage.

In the depicted embodiment, the circuit substrate 302 is generally elongate in shape and the long axis extends along the top of the base 200 from front to back and along the centerline 202 of the base 200, although it will be recognized that other orientations are possible. For example, the circuit substrate 302 may extend transversely with respect to the median plane of the wearer's body, circumferentially with respect to the wearer's head, etc. Likewise, the circuit substrate may be any other desired geometric shape, including without limitation, generally rectangular, generally circular, or any other desired symmetrical or asymmetrical shape.

The illustrated circuit substrate 302 includes three pairs of transversely aligned mounting tabs 304a, 304b, and 304c, with each tab containing a respective opening 306a, 306b, 306c, therein. A first, front contact plate or bezel 308a includes a pair of openings 310a aligned with the pair of openings 306a. As best seen in FIGS. 8 and 9, an opening 312a is located between the pair of openings 310a to expose contact pads 314a on the circuit substrate 302 defining a first set of terminals on the circuit pattern.

Likewise, a second, intermediate contact plate or bezel 308b includes a pair of openings 310b aligned with the pair of openings 306b. An opening 312b is located between the pair of openings 310b to expose contact pads 314b on the circuit substrate 302 defining a second set of terminals on the circuit pattern.

Finally, a third, rear contact plate or bezel 308c includes a pair of openings 310c aligned with the pair of openings 306c. An opening 312c is located between the pair of openings 310c to expose contact pads 314c on the circuit substrate 302 defining a third set of terminals on the circuit pattern.

Each of the contact plates 308a, 308b, 308c, is secured to the circuit substrate 302 using a pair of threaded grommets 316a, 316b, 316c, respectively. The grommets 316a, 316b, and 316c pass through the openings 310a, 310b, and 310c and the respective opening 306a, 306b, and 306c in a corresponding one of the tabs 304a, 304b, and 304c. Each of the grommets 316a, 316b, and 316c includes outer helical threads for receiving a nut 318a, 318b, and 318c, respectively, to thereby engage the respective contact plates 308a, 308b, and 308c to the flexible circuit substrate 302.

Each of the grommets 316a, 316b, and 316c also includes an internally threaded or tapped opening for the removable attachment of a helmet mounted accessory device. The removably attached accessory device includes an electrical connector which is complimentary and matable with the openings 312a, 312b, and/or 312c and which includes an aligned and facing set of contacts or terminals which contact the contact pads 314b when the accessory device is installed on the respective connector 308a, 308b, 308c. The mating connector on the accessory device includes threaded fasteners each of which is removably received in a corresponding aligned one of the internally threaded openings in the grommets 316a, 316b, 316c.

The circuit layer 300 may be advantageously encapsulated in the outer layer or layers 400 that may be a ballistic (i.e., ballistic-resistant) or non-ballistic material. The low profile of the assembly is designed to allow for integration into a variety of manufacturers helmet layups and manufacturing processes.

In certain embodiments, the mounting plates 308a, 308b, and 308c may be integrally formed with the outer layer 400. For example, in certain embodiments, the mounting plates 308a, 308b, 308c and the outer layer 400 are formed, e.g., via injection molding, as a single, monolithic member for subsequent attachment to circuit substrate 302 and to the base member 200. Alternatively, a monolith comprising mounting plates 308a, 308b, 308c, and the outer layer 400 can be formed by overmolding, e.g., injection overmolding, directly over the base 200, circuit substrate 302, and fasteners 316a, 316b, 316c and 318a, 318b, 318c.

Figure 10:
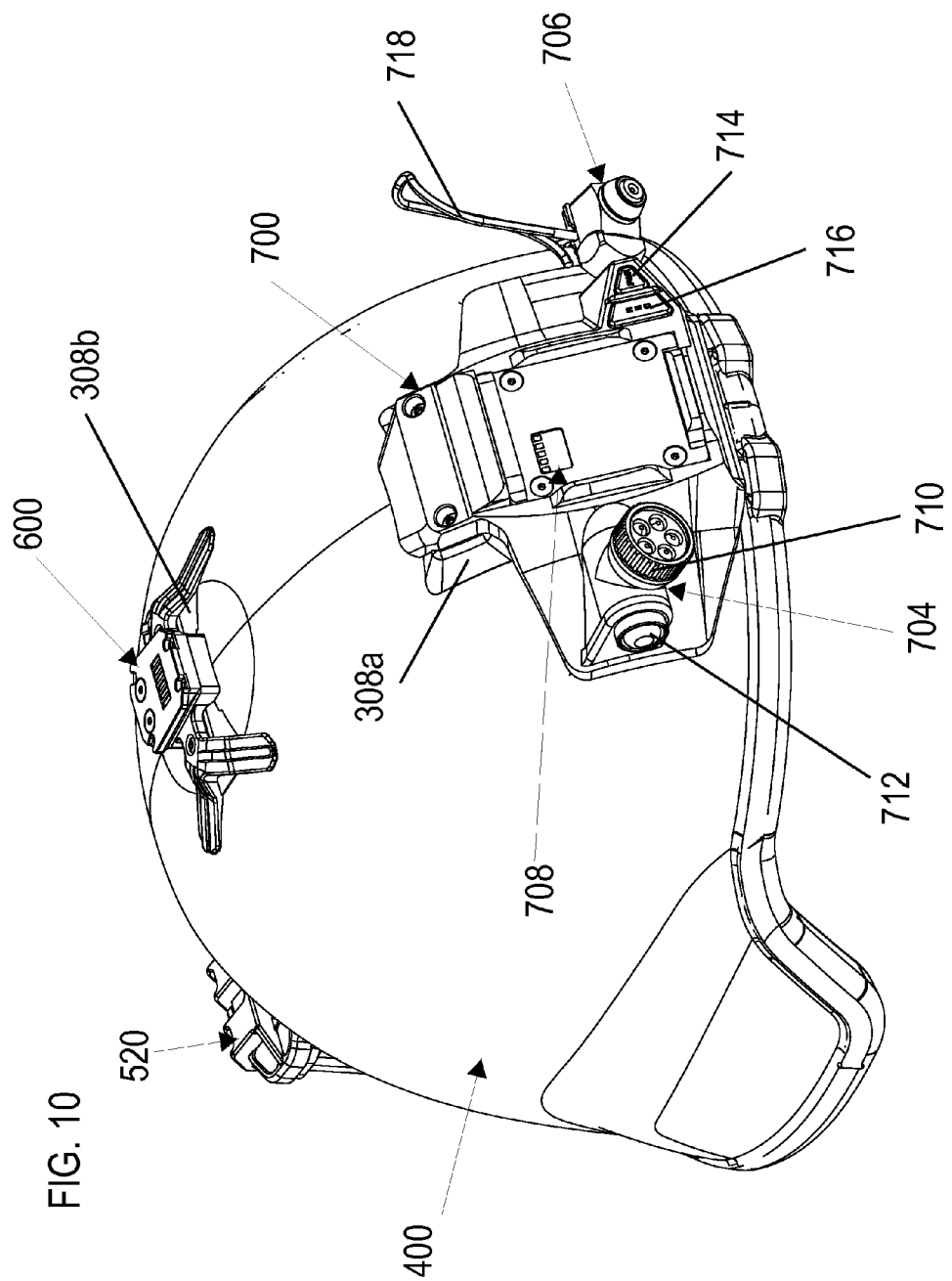
FIG. 10 is an isometric view of the embodiment appearing in FIG. 1, taken generally from the front and side, and having several exemplary accessory devices mounted on the helmet.
Figure 11:
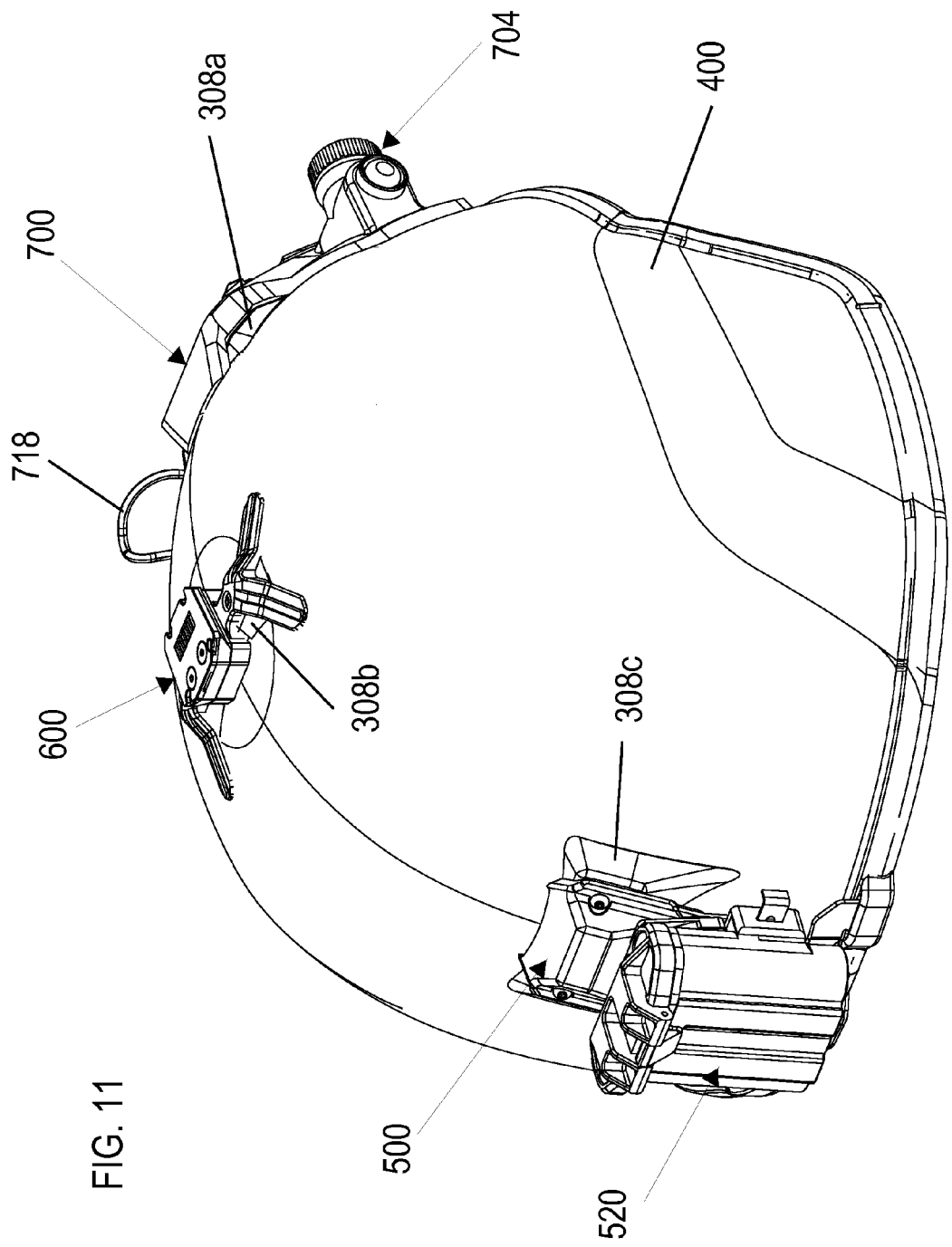
FIG. 11 is an isometric view of the embodiment appearing in FIG. 10, taken generally from the rear and side.
Figure 12:
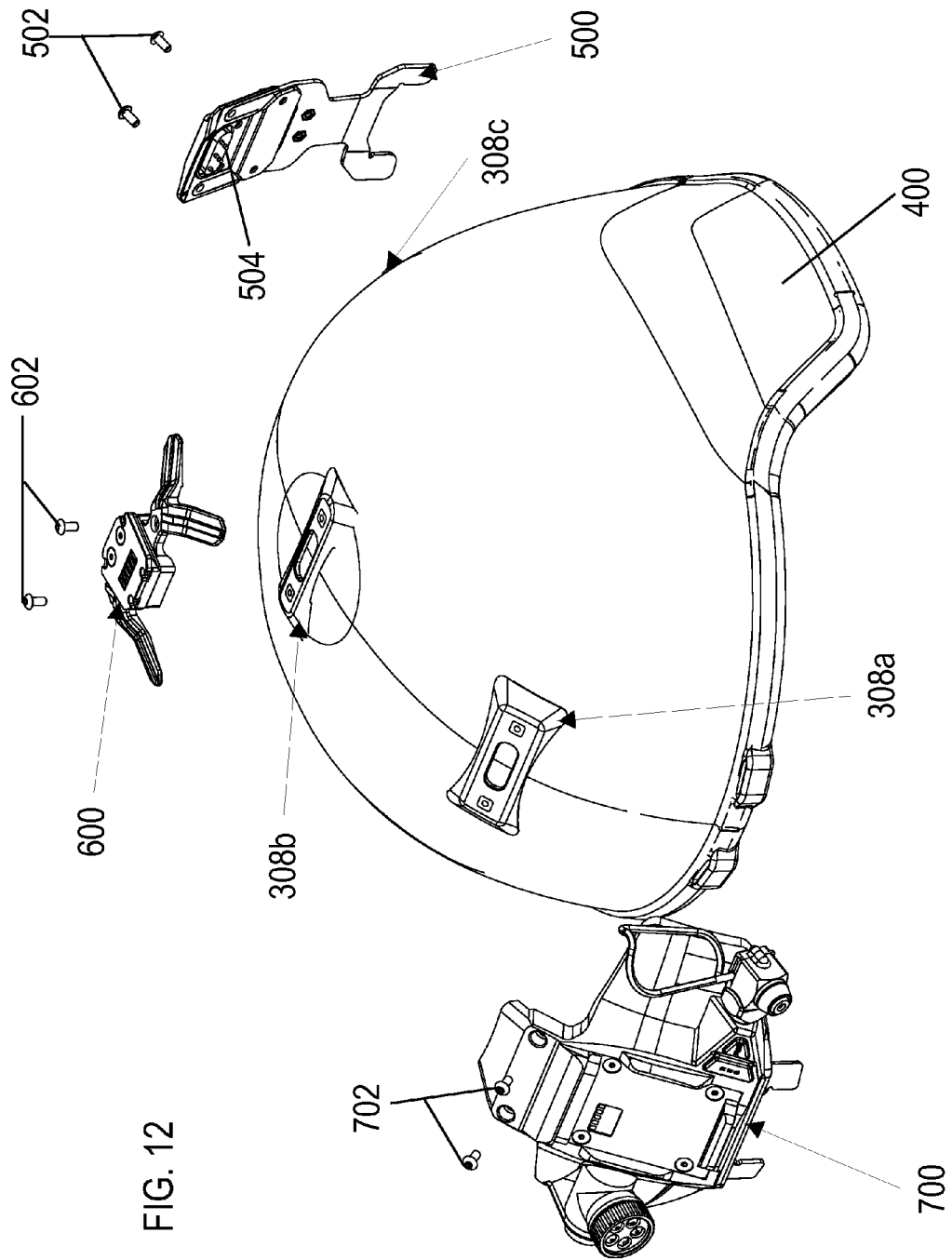
FIG. 12 is an exploded view showing the attachment mechanisms for the exemplary accessory devices.

Exemplary accessory devices mounted on the powered helmet embodiment of FIGS. 1-9 appear in FIGS. 10-12. In the depicted embodiment, a rear mounting plate 500 is attached to the rear connector 308c using fasteners 502 which mate with the pair of threaded grommets 316c. The rear mounting plate 500 includes spring-loaded contact pins 504 which mate with contact pads 314c. An accessory device 520 may be removably attached to the rear mounting plate 500. The accessory device 520 may be a power supply such as a battery or battery pack which supplies electrical power to a device(s) attached to the connectors 308b and/or 308a.

In alternative embodiments, a digital video recorder may be removably connected to the rear mounting plate 500 for storing a digital representation of a video signal received from a remote video camera or imaging device, such as a video camera or imaging device worn by the user, e.g., a video camera or imaging device attached to another one of the connectors 308a and 308b. The storage medium may be a hard disk drive, memory card, optical disk, or other electronic storage medium as known in the art.

In certain embodiments, the video signal may be output from the video/imaging device as a digital signal for storage on the recorded device, or alternatively, may be an analog video signal for conversion to a digital representation via analog-to-digital signal processing electronics onboard the accessory device 520. In certain embodiments, the video signal (analog or digital) may be passed from the video camera/imaging device directly to the recording device via a wired or wireless (e.g., radio frequency) transmission. In alternative embodiments, the analog or digital video signal may be passed from the video camera/imaging device via the conductive pattern formed on the circuit substrate 302.

A top mounting plate 600 may be attached to the contact plate 308b using fasteners 602 which mate with the pair of threaded grommets 316b. The top mounting plate 600 includes spring loaded contact pins (not shown) which mate with contact pads 314b. An accessory device (not shown) may be removably attached to the top mounting plate 600. The accessory device may be a power supply such as a battery or battery pack which supplies electrical power to a device(s) attached to the connectors 308a and/or 308c. Alternatively, the top mounting plate 600 may include an attached identification friend-or-foe (IFF) transponder (not shown), which may be electrically coupled to the battery pack 520 via the circuit pattern of the circuit substrate 302. It will be recognized that other electrically operated devices, such as communication systems, may be employed in place of the illustrated IFF transponder.

A front mounting plate 700 may be attached to the contact plate 308a using fasteners 702 which mate with the pair of threaded grommets 316a. The front mounting plate 700 includes spring loaded contact pins (not shown) which mate with contact pads 314a. An accessory device (not shown) may be removably attached to the front mounting plate 700. The accessory device may be one or more viewing optics and/or imaging devices, such as a monocular, binoculars, monocular or binocular NVG devices, including ENVG devices, thermal imaging devices, cameras, head up display, virtual reality or immersive display, friend or foe identification (IFF) systems, and so forth which may be powered by a power supply attached to the connectors 308b and/or 308c.

The front mounting plate 700 is illustrated includes an LED flashlight 704, a video camera 706, and a powered circuit board 708, e.g., in electrical communication with the power source 520 via the contacts 314b for powering the attached accessory device (not shown). The LED flashlight 704 may include a rotating bezel 710 for selectively changing the colors of the flashlight 704 and a power button 712. The video camera 706 may include buttons, keypad, or the like for controlling the video camera functions, such as a power button 714 for powering on or off a remote video recording device, a record button 716 to toggle between recording and nonrecording modes, and so forth. Control signals from the buttons/keys 714, 716 may be passed to a digital video recorder (DVR) module (not shown), mounted on the connector 308b or 308c, the signals passing via the conductive circuit substrate 302 or, alternatively, via a dedicated wired or wireless connection or interface between the module 700 and the DVR module.

A dedicated cable 718 may be provided for sending the video signal received from the video camera 706 to a digital video recorder (not shown) and/or for transferring power from the power supply 520 to the camera 706. In certain embodiments, power from the remote power supply 520 attached to the system 100 as well as control signals controlling operation of a DVR module also connected to the system 100 (and which DVR module may be separate from the power supply module or integrated with the power supply module) are both carried over the circuit substrate 302, while the video signal from the camera may be carried over a separate interface, such as the dedicated cable 718 or a wireless connection. In other embodiments, however, the video signal from the camera 706 may be transmitted to a remote DVR module on the system 100 via the conductive pattern on the circuit substrate 302. As used herein, the term video is intended to encompass video only as well as video having an associated audio component.

In certain embodiments, the video signal may be an analog video signal for conversion to a digital representation via analog-to-digital signal processing electronics onboard a DVR accessory device mounted to the system 100, e.g., to the top mounting plate 308b or rear mounting plate 308c. In other embodiments, the video signal (analog or digital) may be passed from the video camera/imaging device 706 directly to a recording device via a wired or wireless (e.g., radio frequency) transmission.

In yet other alternative embodiments, the analog or digital video signal may be passed from the video camera/imaging device 706 via the conductive pattern formed on the circuit substrate 302. An exemplary DVR apparatus and recording system are shown and described in commonly owned U.S. patent application Ser. No. 11/972,040 filed Jan. 8, 2008, now U.S. Publication No. US2008/0170838, published Jul. 17, 2008. The aforementioned application and publication are incorporated herein by reference in their entireties.

In further alternative embodiments, an auxiliary camera (which may in addition to or as an alternative to the camera 706) may be provided as a removably attached device. For example, a viewing device attached to the front mount 700 may include a camera, either as an integral component or as an add-on component. For example, in the case of low light viewing device (e.g., night vision device, thermal or IR device, short wave infra-red device or other device for viewing in low light conditions), such auxiliary camera may be a night time or low lux camera. In the case of a standard night vision goggle or other standard viewing device a beam splitter may be provided, e.g., carried on an adapter ring adapted to be received over the viewing end of the night vision or other viewing device. In this manner, the beam splitter can be supported along the optical path of the viewing device such that a portion of the output image is reflected 90 degrees with respect to the optical axis to the a camera device for recording. The portion of the output image from the viewing device that is not reflected by the beam splitter passes through the beam splitter to the user's eye. In this manner, the output display of the viewing can be simultaneously recorded as video data and simultaneously viewed by the user. An exemplary camera and recording system may be shown and described in the above-incorporated U.S. patent application Ser. No. 11/972,040 filed Jan. 8, 2008 and U.S. Publication No. US2008/0170838.

The front mounting plate 700 and its integrated power contact 708 can be used in conjunction with a mounting apparatus (not shown), e.g., to position a viewing device before the eye(s) of a user donning the system 100. Preferably, the mounting apparatus is a pivoting helmet mount of the type used to selectively pivot a viewing device between a viewing position in front of the eye(s) of a user and a stowed position up and out of the user's line of sight.

The viewing device may be a night vision goggle (monocular or binocular) device or other optical or imaging device, such as thermal or infrared (IR) devices (including shortwave IR devices), head mounted displays (such as head-up displays, immersive displays, etc.), or other type of device.

The mounting system 100 provides electrical communication with a power supply located at a remote location on the helmet, thereby allowing for the use of a simplified viewing device which does not require its own power supply. Also, because the viewing device does not need to include an integral power supply, it is possible to reduce the size and weight of the viewing device. By reducing the weight of the viewing device, the weight hanging out front of the operator's face is reduced, thereby reducing neck torque and strain during use. The present system also allows for fast and easy replacement of the power supply by way of the rear docking station 500 allowing facile replacement of a spent battery pack 520 with a new/fully charged battery pack 520.

Figure 13:
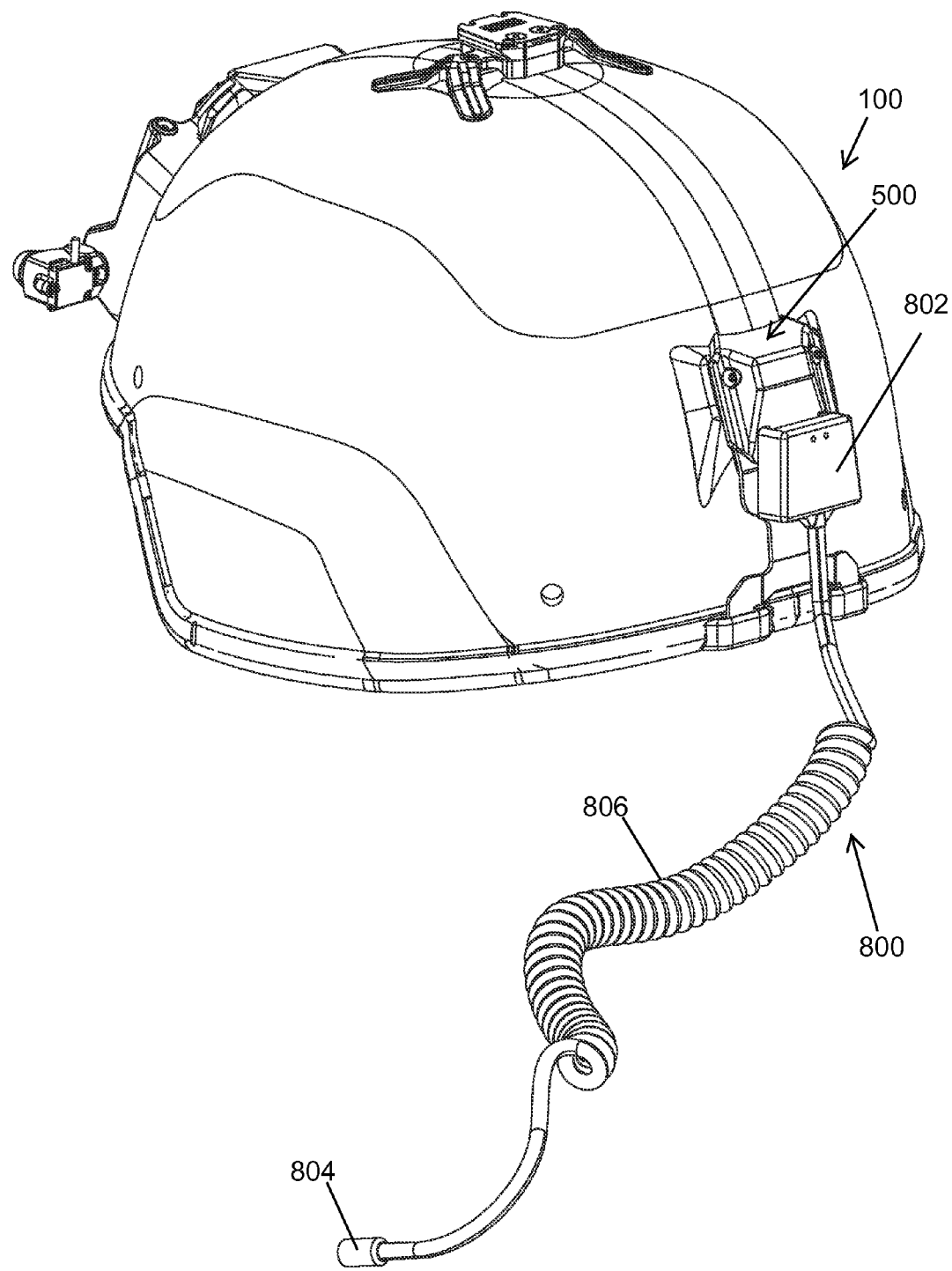
FIG. 13 is an isometric view taken generally from the rear and side showing an adapter for electrically coupling an accessory device located remotely from the user.

Referring now to FIG. 13, there appears a helmet system 100 used in conjunction with a power adaptor 800 to provide an electrical communication between a remote power supply and a device located elsewhere on the helmet 100. The adapter 800 includes a first electrical connector 802 which is removably received on the rear mounting plate 500 in place of the battery pack 520 (see FIG. 11) to provide an electrical coupling between the circuit substrate 302 and the first adapter 802. The first connector 802, in turn, is electrically coupled to a second electrical connector 804 via a conductive cable 806. The second connector 804 is adapted to mate with an electrical connector on a remote power supply, e.g., contained in a device, article or piece of equipment carried by or worn by the user. In this manner, the adapter 800 and the circuit layer 300 cooperate to provide power to an attached accessory device. In alternative embodiments, either in addition to or as an alternative to providing electrical connection to a remote power supply, the adapter 800 may also be used in conjunction with one or more buttons or keys to provide remotely actuated control signals for controlling operation of an accessory device mounted on the helmet via the circuit layer 300.

Referring now to FIGS. 14-18, there appears an alternative embodiment 1100 including a helmet base layer 1200, e.g., which may be a ballistic helmet or preform as described above, an outer shell layer 1400, and a circuit layer 1300 disposed between the helmet layer and the shell layer.

The circuit layer 1300 in the illustrated embodiment includes a front arm 1302a and a rear arm 1302b extending along the medial plane of the helmet, and a pair of transversely extending arms 1302c extending transversely with respect to the medial plane. It will be recognized that other shapes and configurations are also contemplated.

The front arm 1302a includes a circuit substrate carrying conductive circuit components for delivery of electrical power and/or data or signal to a plurality of contact pads 1322a. The distal portion of the circuit substrate arm 1302a may be housed in a housing 1320a, such as a plastic housing, with aligned openings to expose the contact pads and provide additional rigidity around the terminal pads.

The rear arm 1302b includes a circuit substrate carrying conductive circuit components for delivery of electrical power and/or data or signal to a plurality of contact pads 1322b. The distal portion of the circuit substrate arm 1302b may be housed in a housing 1320b, such as a plastic housing, with aligned openings to expose the contact pads and provide additional rigidity around the terminal pads. The housing 1320b may include mounting hardware, such as threaded fasteners 1324, for mounting an accessory of mounting adapter.

The transverse arms 1302c include a circuit substrate carrying conductive circuit components for delivery of electrical power and/or data or signal to a plurality of contact pads 1322c. The distal portion of the circuit substrate arm 1302c may be housed in a housing 1320c, such as a plastic housing, with aligned openings to expose the contact pads and provide additional rigidity around the terminal pads.

The housings 1320a, 1320b, 1320c in the depicted embodiment of FIGS. 14-18 may be adhesively bonded to the circuit substrate, attached using mechanical fasteners, and so forth.

The covering 1400 provides an outer layer which may or may not provide further anti-ballistic properties of the helmet. In the illustrated embodiment, the outer layer includes integrally molded mounting features, including a front mounting member 1402a, a rear mounting member 1402b, and two side mounting members 1402c. In alternative embodiments, the molded mounting features could be separately formed and applied under the shell layer.

The front mounting feature 1402a includes an opening 1406a exposing the contact pads 1322a. Additional mounting hardware may be embedded between the base layer 1200 and the outer layer 1400, such as an internally threaded boss 1404 extending through an opening 1408a in the mounting member 1402a for attachment of an accessory device or mounting adapter for an accessory.

The rear mounting feature 1402b includes an opening 1406b exposing the contact pads 1322b. Openings 1408a in the mounting member 1402a align with the fasteners 1324 for attachment of an accessory device or mounting adapter for an accessory.

The side mounting features 1402c include an opening 1406c exposing the contact pads 1322c. Additional mounting hardware may be embedded between the base layer 1200 and the outer layer 1400, such as internally threaded bosses 1404 extending through openings 1408c in the mounting member 1402c for attachment of an accessory device or mounting adapter for an accessory.

Figure 14:
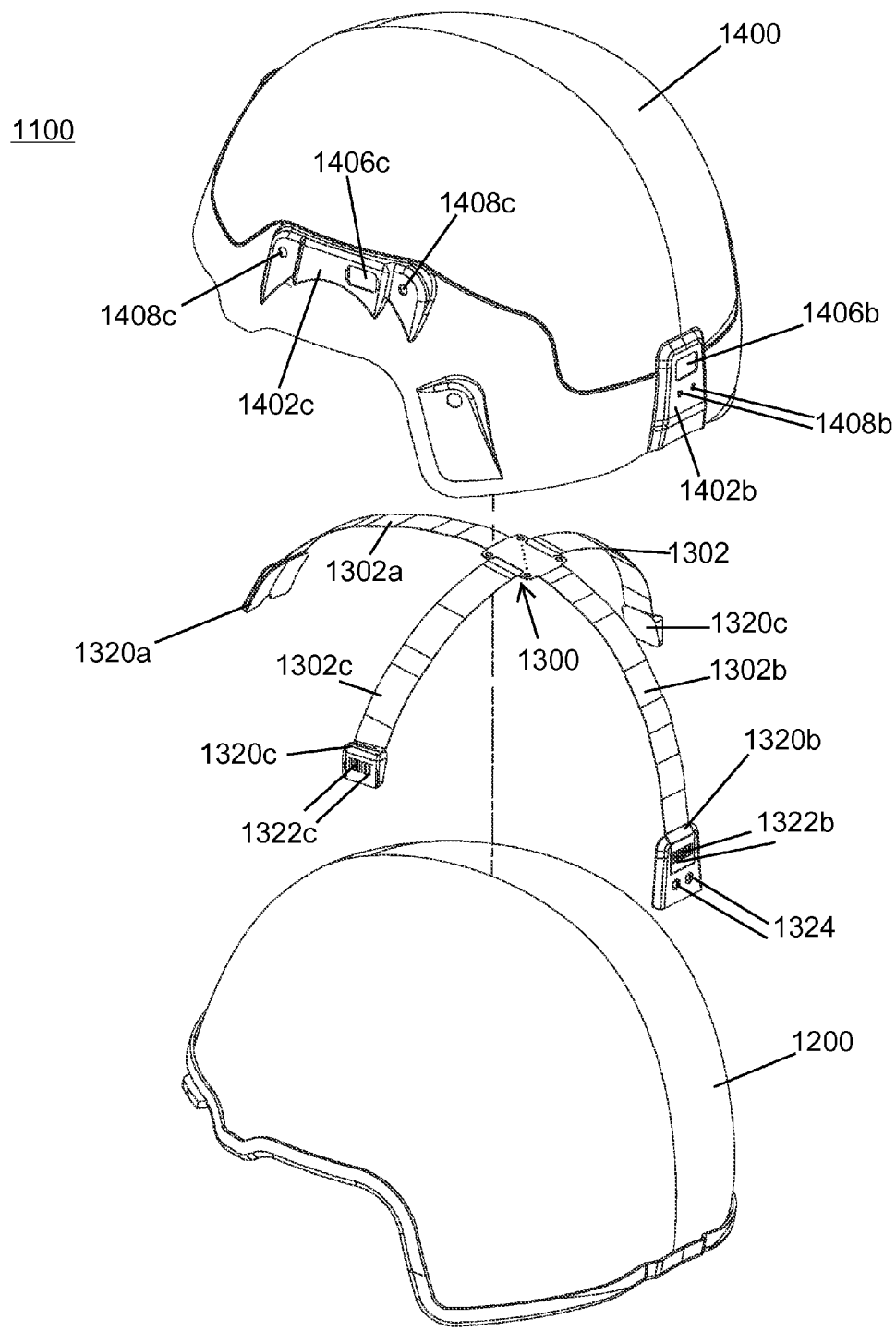
FIG. 14 is an exploded view of a helmet with further exemplary embodiment of the power distribution system herein.
Figure 15:
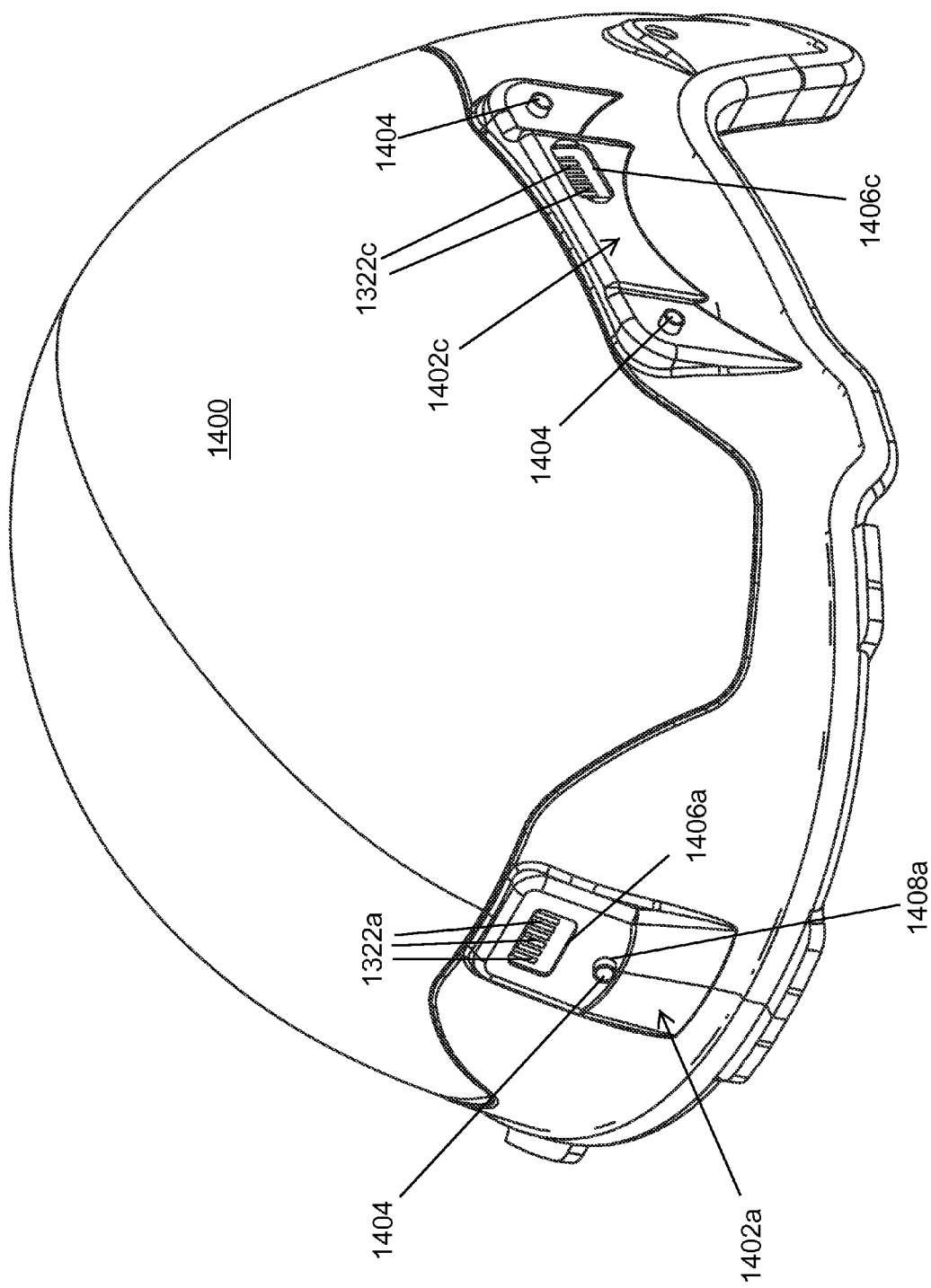
FIG. 15 is front isometric view of the helmet embodiment appearing in FIG. 14.
Figure 16:
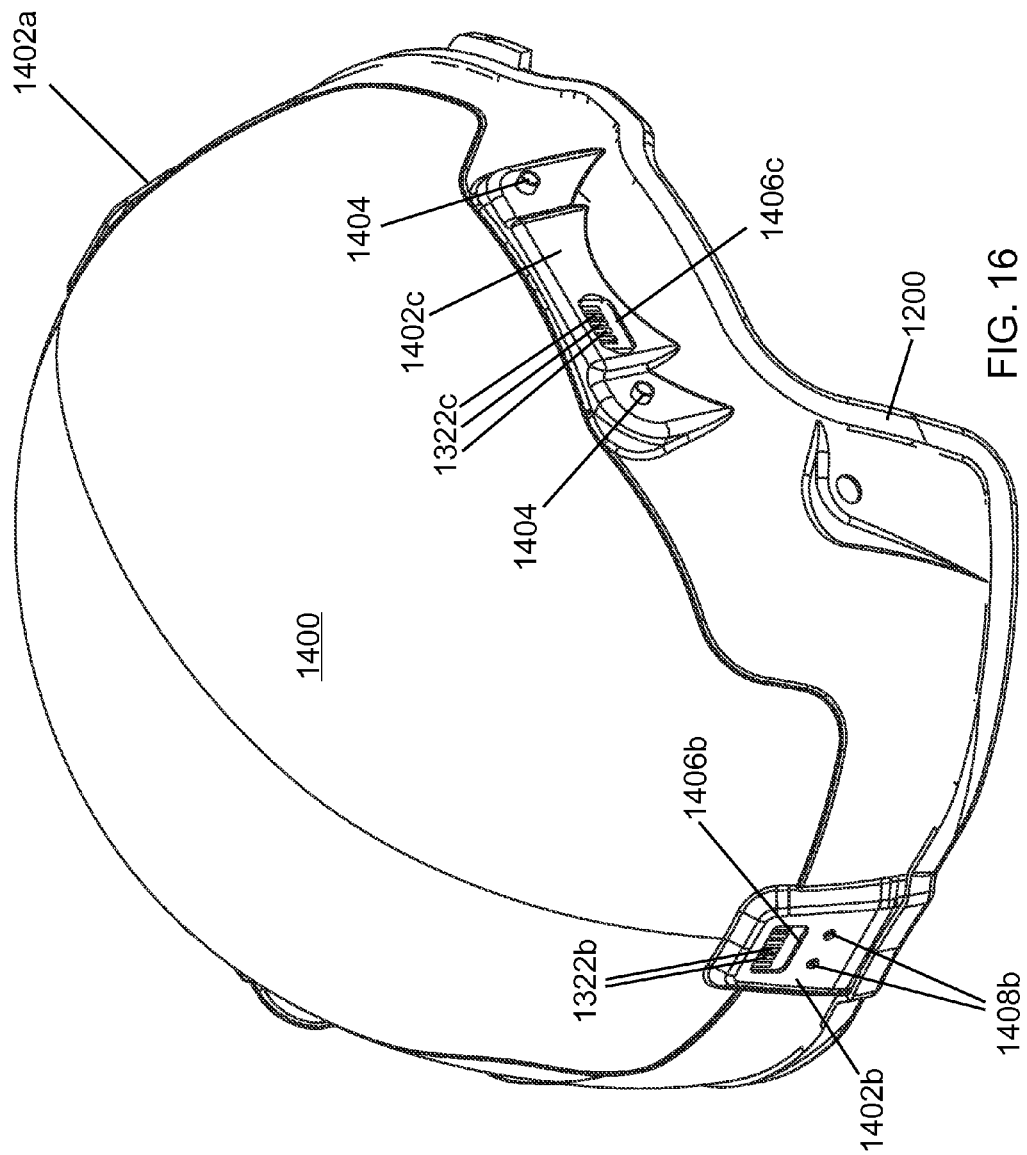
FIG. 16 is a rear isometric view of the helmet embodiment appearing in FIG. 14.
Figure 17:
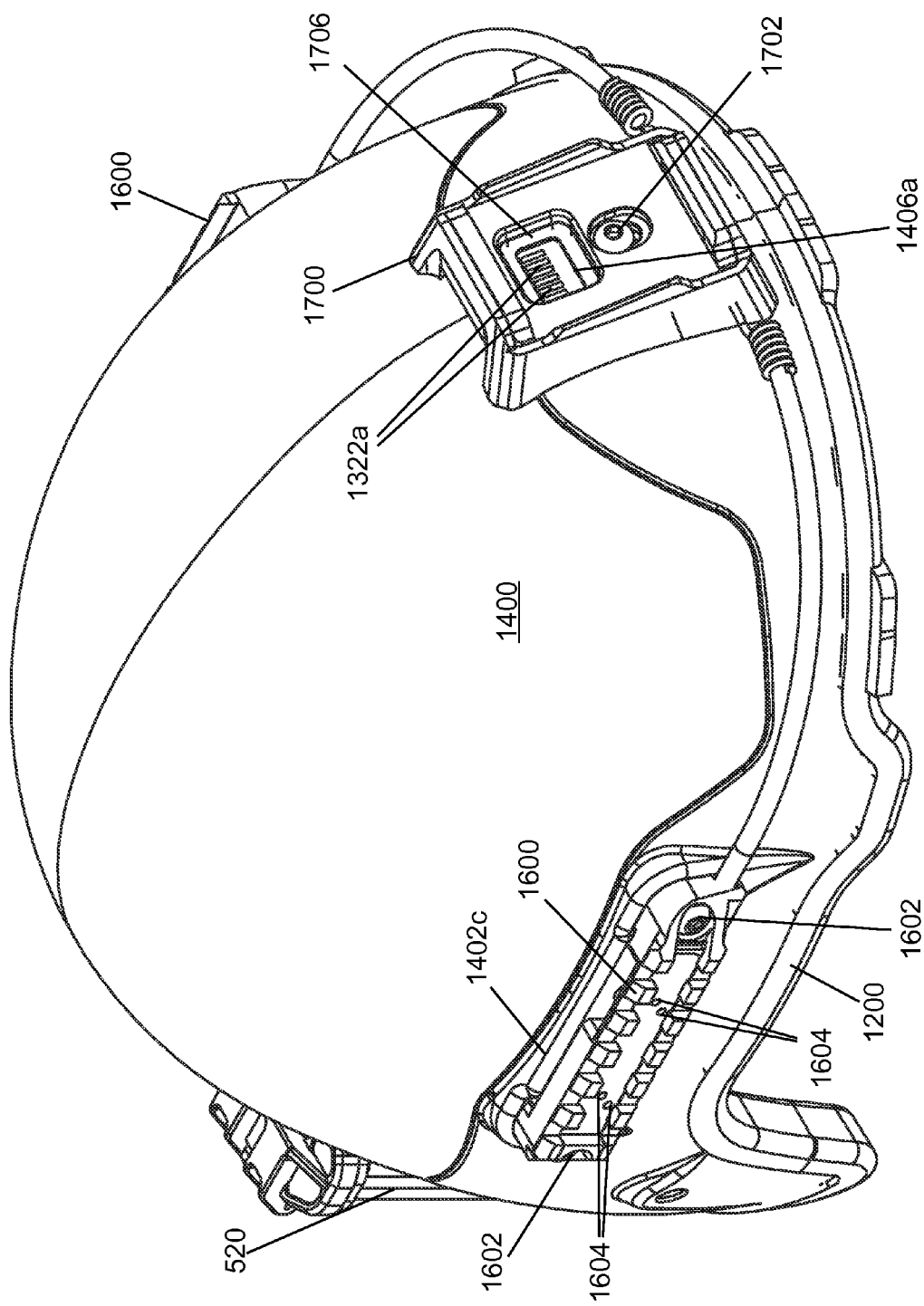
FIGS. 17 and 18 are, respectively, front and rear isometric view of the helmet embodiment appearing in FIG. 14, with an exemplary power supply and adapters attached thereto.
Figure 18:
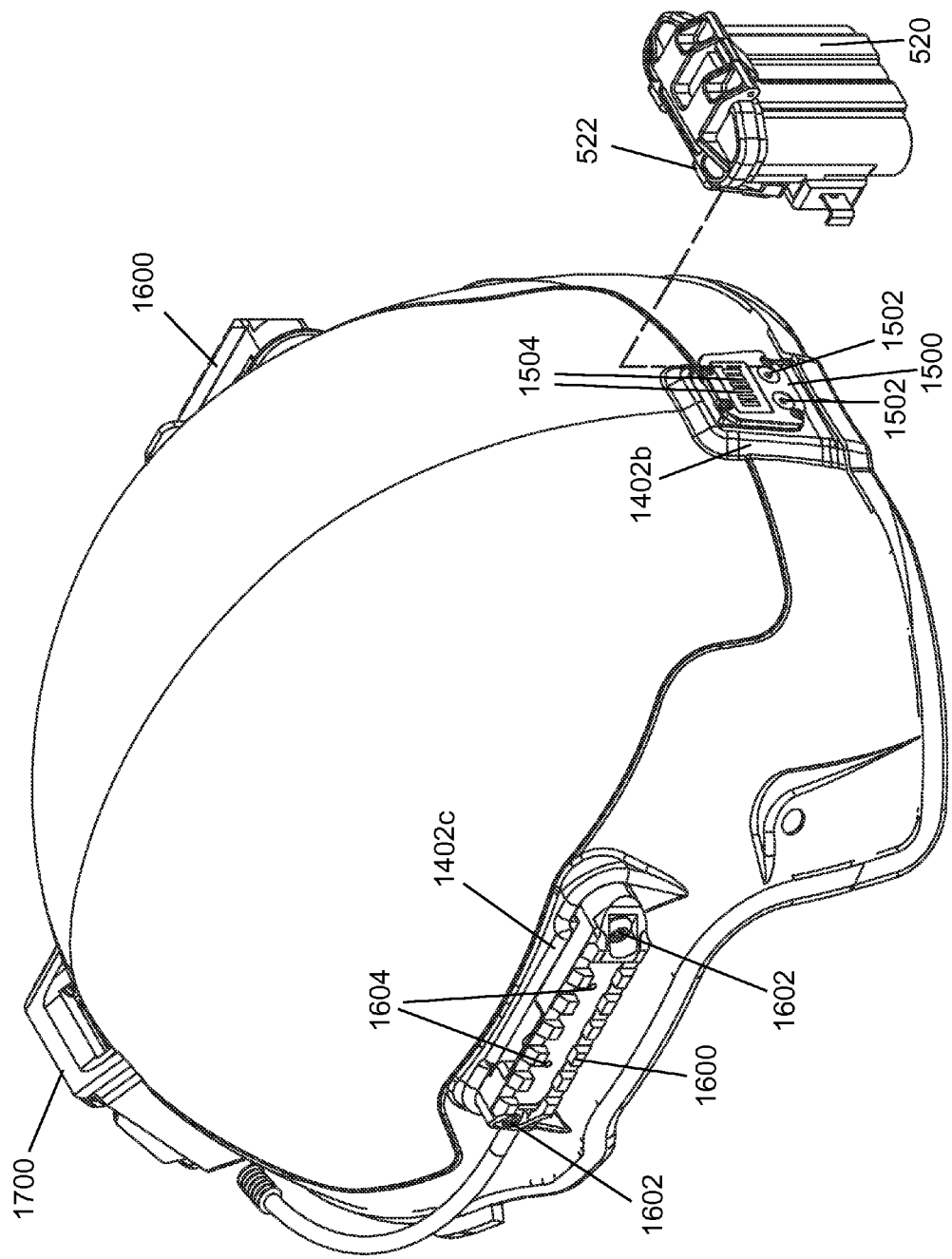

Referring now to FIGS. 17 and 18, and with continued reference to FIGS. 14-16, a front adapter 1700 is secured to the mounting member 1402a via a threaded fastener 1702 engaging the mounting hardware 1404. An opening 1706 is aligned with the opening 1406a in the mounting member 1402b to expose the contact terminal pads 1322a. The illustrated front adapter 1700 is a bracket or shroud for attaching a helmet mounted viewing device. For example, a pivoting helmet mount (not shown) may be secured to the bracket 1700 to mount a vision device before the eyes of a user wearing the helmet and to pivot the viewing device up and out of the user's line of sight when not in use. Such helmet mounts are generally known in the art, see for example, commonly owned U.S. Pat. No. 7,219,370 issued May 22, 2007; U.S. Published Application Nos. 2011/0145981 published Jun. 23, 2011, 2007/0214551 published Sep. 20, 2007, and 2010/0299814 published Dec. 02, 2010; and U.S. application Ser. Nos. 12/117,704 filed May. 08, 2008, Ser. No. 12/259,010 filed Oct. 27, 2010, Ser. No. 12/759,435 filed Oct. 27, 2010, Ser. No. 13/019,889 filed Feb. 02, 2011, 61/351,084 filed Jun. 03, 2010, 61/300,770 filed Feb. 02, 2010, and 61/263,159 filed Nov. 20, 2009. Each of the aforementioned references is incorporated hereby be reference in its entirety.

A rear adapter 1500 is secured to the rear mounting member 1402b, e.g., via threaded fasteners 1502 engaging the fasteners 1324 on the rear housing 1320b. The adapter 1500 provides a pass through connection between contacts 1504 on the adapter 1500 and the contact terminal pars 1322b. The exemplary adapted 1500 is a dovetail mounting shoe which provides a secure mechanical connection and electrical connection between the helmet and the circuit layer 1300. The illustrated accessory device is a battery pack 520 which includes a mating female connector 522 for removably attachment to the adapter 1500 and delivery of electrical power to devices attached elsewhere on the helmet.

Side adapters 1600 are secured to the side mounting members 1402c via threaded fasteners 1602 engaging the mounting hardware 1404. The exemplary illustrated side adapters 1600 are mounting rail adapters, e.g., Picatinny rail members which allow attachment to the helmet of accessory devices that have a rail grabber for mounting on the rail interface of a weapon. Electrical contacts 1604 in the adapters 1600 provide a pass through electrical connection to the terminal pads 1322c. The rail members 1600 and associated contacts and circuit components may be as described in commonly owned U.S. Pat. No. 8,091,265 issued Jan. 10, 2012, the entire contents of which are incorporated herein by reference.

The invention has been described with reference to the preferred embodiments. Modifications and alterations will occur to others upon a reading and understanding of the preceding detailed description. It is intended that the invention be construed as including all such modifications and alterations.

Having thus described the preferred embodiments, the invention is now claimed to be:

1. A helmet accessory power distribution system for providing a supply of electrical power to one or more electrical power-consuming devices attached to a helmet, the system comprising:
   a circuit layer extending across a portion of the helmet, said circuit layer defining a circuit and including a plurality of terminal pads, each of said terminal pads including two or more electrical contacts, and electrical conductors interconnecting the terminal pads;
   a cover attached to the circuit layer over each terminal pad, said cover having an aperture aligned with and exposing the electrical contacts; and
   one or more mechanical fasteners configured to removably and securely hold a helmet accessory in mechanical contact with the cover and in electrical contact with the exposed electrical contacts.

2. The helmet accessory power distribution system of claim 1, wherein the circuit layer includes a circuit board substrate having a circuit formed thereon.

3. The helmet accessory power distribution system of claim 2, wherein the circuit board substrate is formed of a flexible, electrically insulating material.

4. The helmet accessory power distribution system of claim 3, further comprising a rigid housing covering a portion of the circuit board substrate and receiving the terminal pads and having at least one aperture exposing the electrical contacts.

5. The helmet accessory power distribution system of claim 1, further comprising an externally threaded grommet extending through aligned openings in said cover and said circuit layer and an internally threaded nut engaged with said externally threaded grommet to attach said cover to said circuit layer.

6. The helmet accessory power distribution system of claim 5, wherein said cover is attached to said circuit layer using a pair of said externally threaded grommets disposed on opposite transverse sides of the circuit layer.

7. The helmet accessory power distribution system of claim 5, wherein said externally threaded grommet further includes an internally threaded portion adapted to removably engage complimentary externally threaded connectors on a helmet accessory.

8. The helmet accessory power distribution system of claim 1, wherein the circuit comprises one or both of:
   a power bus for providing electrical power from a battery device to an accessory device; and
   a signal bus for transmitting an electronic signal to or from an accessory device.

9. The helmet accessory power distribution system of claim 8, wherein the electronic signal is selected from one or more of an analog video signal, digital video signal, analog audio signal, digital audio signal, analog control signal, digital control signal, analog data signal, and digital data signal.

10. The helmet accessory power distribution system of claim 1, wherein the helmet accessory is selected from one or more of a power supply, friend-or-foe transponder, audio and/or video communications system, optical and/or electro-optical viewing device, audio, video and/or image recording device, and electronic data storage medium.

11. The helmet accessory power distribution system of claim 1, wherein the circuit is a printed circuit.

12. The helmet accessory power distribution system of claim 1, wherein the circuit is a printed circuit printed with a conductive ink.

13. The helmet accessory power distribution system of claim 1, further comprising a power connector electrically coupled to the circuit for electrically coupling an electrical power-consuming device on the helmet to a remotely located power supply.

14. The helmet accessory power distribution system of claim 1, further comprising a mounting adapter removably secured to the cover, the mounting adapter for both mechanically attaching an electrical power-consuming device and for providing a pass through electrical connection between the circuit and the electrical power-consuming device.

15. A helmet construction comprising the helmet accessory power distribution system of claim 1 and a helmet attached to the circuit layer.

16. The helmet construction of claim 15, wherein the helmet is a multilayer ballistic helmet comprising one or more layers of ballistic resistant material, and further wherein the one or more mechanical fasteners do not penetrate any of the one or more layers of ballistic resistant material.

17. The helmet construction of claim 16, further comprising an outer layer disposed over the helmet and the circuit layer.

18. The helmet construction of claim 17, wherein the outer layer is selected from a shell formed of a non-ballistic resistant material and one or more plies of a ballistic resistant material.

19. The helmet construction of claim 18, wherein the outer layer is selected from an outer layer separately applied over the circuit layer and the covers and an outer layer that is integrally formed with the covers.

20. A method of providing a supply of electrical power to one or more electrical power-consuming devices attached to a helmet, the method comprising:
    providing a circuit layer extending across a portion of the helmet, said circuit layer defining a circuit and including a plurality of terminal pads, each of said terminal pads including two or more electrical contacts and electrical conductors interconnecting the terminal pads;
    attaching covers to the circuit layer over each terminal pad, the covers having an aperture aligned with and exposing the electrical contacts;
    securing a power supply to one of the covers and an electrical power-consuming device to another one of the covers with one or more mechanical fasteners, the one or more mechanical fasteners configured to removably and securely hold the power supply and the electrical power-consuming device in mechanical contact with the cover and in electrical contact with the exposed electrical contacts; and
    providing power delivery from the power supply to the electrical power-consuming device through the circuit layer.

* * * * *